Patented Oct. 20, 1925.

1,557,764

UNITED STATES PATENT OFFICE.

MAUD E. NEIL, OF WASHINGTON, DISTRICT OF COLUMBIA.

MEANS FOR INHIBITING THE DETERIORATION OF YEAST CELLS.

No Drawing.  Application filed October 4, 1921. Serial No. 505,388.

*To all whom it may concern:*

Be it known that I, MAUD E. NEIL, a citizen of the United States, residing at Washington, in the District of Columbia, have invented certain new and useful Improvements in Means for Inhibiting the Deterioration of Yeast Cells; and I do hereby declare the following to be a full, clear, and exact description of the invention, such as will enable others skilled in the art to which it appertains to make and use the same.

My invention relates to means for inhibiting the deterioration of yeast cells.

I have discovered that by adding a suitable quantity of a powder obtained by evaporating cows' milk to yeast such as is now in commerce in the form of a cake and generally referred to as "compressed yeast", it is possible to preserve said yeast at ordinary temperatures for an indefinite period of time. By this means I am enabled to produce yeast in large batches and maintain it in an active state for a considerable period of time without the use of expensive refrigerating plants, thus enabling me to greatly reduce the cost of the manufacture and distribution of yeast.

I am unable to state whether the milk powder operates upon the living cells or upon the enzymes, zymase or invertase formed by the life processes of said cells, nor am I able to state whether powder obtained by the evaporation of milk acts by nourishing the yeast cells, or by preventing their gemmation and superfission, or by preventing absorption of moisture by said cells, or by furnishing a pabulum for the nourishment of the yeast cells, nor am I able to state whether it is the conglomerate obtained by the evaporation of cows' milk that proves effective, or whether it is the milk sugar alone, or the butter fat, or the casein, or the soluble albumen, or the mineral matters, or combinations of these that prove effective.

In whatever manner the milk powder, or any of the substances thereof, acts upon the yeast, its effect is to preserve it for an indefinite time so that by the addition of moisture to the conglomerate formed of the milk powder and the yeast, the yeast cells are rendered active.

In carrying out my invention, I rub the milk powder into the yeast in order to form an intimate mixture of the two substances. The milk powder may be mixed in any manner with the yeast, the requirement being that the two be thoroughly commingled.

While the milk powder may be mixed with the yeast in varying proportion, one proportion which I have found to be satisfactory is obtained by rubbing two ounces of milk powder with two ounces of yeast so as to make four ounces of the conglomerate.

If the yeast is dry so that the milk powder does not mix readily therewith, I moisten the two substances with a suitable amount of a solution of arrowroot prepared as follows:—

I first mix thoroughly one-eighth of an ounce of dry arrowroot powder with two ounces of cold water and then stir the resultant mixture into two ounces of boiling water. The paste thus made serves to bind the particles of yeast and milk powder together.

I claim:—

1. Means for inhibiting the deterioration of compressed yeast comprising a mixture of said yeast, a powder obtained by the evaporation of cows' milk and cooked arrowroot powder.

2. Means for inhibiting the deterioration of compressed yeast comprising a mixture of two parts of said yeast, two parts of a powder obtained by the evaporation of cows' milk, one-eighth part of cooked arrowroot powder and sufficient water to thoroughly mix said substances.

In testimony whereof, I affix my signature.

MAUD E. NEIL.